UNITED STATES PATENT OFFICE.

JACOB B. SLICHTER, OF KALAMAZOO, MICHIGAN.

IMPROVEMENT IN PAINT COMPOSITIONS.

Specification forming part of Letters Patent No. 179,967, dated July 18, 1876; application filed August 30, 1875.

*To all whom it may concern:*

Be it known that I, JACOB B. SLICHTER, of Kalamazoo, in the county of Kalamazoo and State of Michigan, have invented a new and useful Compound as a Base for Paint; and I do hereby declare the following to be a full, clear, and exact description thereof, which will enable others skilled in the art to which it appertains to prepare and use the same.

My invention relates to that class of compounds used in the manufacture of fire and water proof paints; and it consists in a composition formed by mixing the following-named ingredients in or about the proportions specified, to wit: Three pints of linseed-oil; two pints of naphtha; two pints of water-glass; one pint solution of chloride of calcium; four ounces of resin; two ounces of gum-dammar; four ounces of asphaltum or paraffine.

In preparing my said compound for use, I first dissolve the resin and asphaltum or paraffine in the linseed-oil by subjecting them to a gentle heat, and, when properly united, the solution is allowed to cool, and the water-glass added thereto. I next dissolve the gum-dammar with the naphtha, and then add thereto the solution of chloride of calcium, and, when properly united, the same is added to and thoroughly mixed with the solution of oil, resin, asphaltum, and water-glass above specified, when the compound is ready for use as a base for paints.

The compound, prepared as specified, forms a base to which any desired ingredients constituting the body of the paint may be added, and, when thoroughly mixed, is laid on the article to be painted in the usual manner, and is as nearly fire-proof as any substance can be made.

In preparing the said compound to be used in white or light-colored paints, I substitute for the asphaltum an equal amount of paraffine, and which is dissolved in the linseed-oil the same as the asphaltum.

Paints in which my said compound is used as a base dry very quickly, forming a hard surface, capable of a high degree of finish, and are wholly inodorous.

Having thus described my invention, what I claim as new, and desire to secure by Letters Patent, is—

The composition, as a base for paint, consisting of linseed-oil, naphtha, water-glass, chloride of calcium, resin, gum-dammar, and asphaltum or paraffine, in or about the proportions specified.

JACOB BENJAMIN SLICHTER.

Witnesses:
J. W. THOMPSON,
H. P. STOCKTON.